United States Patent

[11] 3,586,831

| [72] | Inventors | Akisada Naoi<br>Tokyo;<br>Masaaki Kubo, Funabashi-shi, Japan |
|---|---|---|
| [21] | Appl. No. | 889,029 |
| [22] | Filed | Dec. 30, 1969 |
| [45] | Patented | June 22, 1971 |
| [73] | Assignee | Hitachi Heating Appliances Co., Ltd.<br>Tokyo, Japan |
| [32] | Priority | Mar. 7, 1969 |
| [33] | | Japan |
| [31] | | 44/16893 |

[54] HEAT RESPONSE CONTROL CIRCUIT
1 Claim, 6 Drawing Figs.

[52] U.S. Cl. ............................................. 219/505
[51] Int. Cl. .............................................. H05b 1/02
[50] Field of Search ................................. 219/501, 504, 505

[56] References Cited
UNITED STATES PATENTS

| 2,611,854 | 9/1952 | McNairy ........................ | 219/505 |
| 2,745,944 | 5/1956 | Price ............................. | 219/505 |
| 2,846,559 | 8/1958 | Rosenberg..................... | 219/505 |
| 3,462,585 | 8/1969 | Somers.......................... | 219/505 X |
| 3,493,727 | 2/1970 | Hosokawa et al............. | 219/505 |

Primary Examiner—Bernard A. Gilheany
Assistant Examiner—F. E. Bell
Attorney—Craig, Antonelli, Stewart and Hill ABSTRACT: A heat response control circuit using a compound of a low hygroscopic polyamide resin and a surface activator as a heat sensitive material, and combining a rectifying element having a control electrode and its accessory device with said heat-sensitive means such that a prescribed temperature may be maintained within a usual temperature range; heating is automatically discontinued in the case of accidental overheating, but is automatically reset when cooled down to within the usual temperature range.

INVENTORS
AKISADA NAOE and MASAAKI KUBO

BY
Craig, Antonelli, Stewart & Hill
ATTORNEYS

HEAT RESPONSE CONTROL CIRCUIT

This invention relates to a heat response control circuit, in which a heat-sensitive means formed by disposing a polyamide compound (polyamide plus a surface activator) between a pair of conductors and a control means for controlling the load current by varying or breaking the conduction angle are comprised.

In a unusually well-known heat response control circuit, a pair of conductors, i.e., an electric heater wire and a detecting wire, are disposed with a space therebetween and an organic macromolecule material having a negative thermal coefficient is disposed as a heat-sensitive material between the conductors so that the electrical characteristics between the conductors are made to vary in accordance with a temperature rise to operate the control device. In devices using such a heat response control circuit any local anomalous overheating of the electric heater wire can be immediately detected. Therefore, the devices have been used for home heating appliances, in particular for electric blankets, electric carpets and electric curtains, etc.

As the above organic macromolecular materials, polyvinyl chloride, cellulose ester, polyamide, and a polymer of acryl acid ester and acrylonitril are employed. The control means is operated by means of a DC or AC resistance, the capacitive reactance or the impedance possessed by such materials, which all show a variation with temperature, and mainly consists of transistor amplifier circuits. However, the main heat control factor of the above materials has been in practice their resistance variation. For usual control within a low temperature range such as near 60°C., amplification by transistors, etc. is necessary, because of the detection of a high resistance value. This has made the control means very complicated. Further, the resistance of the heat-sensitive layer was often affected by moisture, i.e., the control means acted differently, depending on whether the atmosphere was wet or dry.

To obviate such shortcomings the resistance and capacitance variations are combined into a heat controlling factor of the materials. By this the moisture dependence is reduced and a simple and stable operation of the control means is achieved.

This invention uses a compound of a low hygroscopic polyamide resin and surface activator as a heat-sensitive material for the heat response control circuit. By combining such a heat-sensitive means and a rectifying element having a control electrode the above-mentioned defects are totally removed.

One object of this invention is to obtain a heat response control circuit, in which a prescribed temperature is automatically maintained in a usual low temperature range; heating is automatically discontinued due to anomalous overheating but is automatically reset when cooled down to within the usual temperature range.

The second object of this invention is to obtain a heat response control circuit for a device which operates with stability against moisture and temperature changes over a long term.

The third object of the present invention is to obtain a heat response control circuit for a device which has few components, is simply fabricated and economical.

A heat-sensitive material suited to such a heat response control circuit meeting these requirements preferably has the characteristics that the electric resistance decreases exponentially with a temperature rise while the capacitive reactance increases gradually up to a certain temperature but rapidly thereabove. For this purpose it has been practiced to combine polyvinyl chloride with an ionic, e.g. cation or anion, surface activator. However, this method could not give any good heat-sensitive material because of the poor heat resistance property of polyvinyl chloride.

The heat-sensitive material adopted by the inventor is obtained by combining polyamide resin with a surface activator. To make it more effective it is recommended to combine a low hygroscopic polyamide resin with less than about 5 percent by weight of a nonionic or amphoteric surface activator. Nylon 8, 10, 11, 12 or 610, 611, 612 are good for a low hygroscopic polyamide. The reason for using the nonionic or amphoteric surface activator is that a negative ionic one tends to cause erosion at the contact portion with conductors, and that decomposition occurs when it is mixed with polyamide in the case of fused mllding, The polyoxyethylene-glycol system of an alkylamide of a phosphoric acid ester-type, the polyhydric alcohol system of a solbitane ester or a glyconamide type and the fatty acid alkylolamide system are suitable for the nonionic surface activator. Carboxylate of imidazoline or amidoamine-type gives favorable effects for the amphoteric surface activator. The amount of addition of surface activator is dependent on its kind, but usually less than about 5 l percent by weight of polyamide. Above this limit the mechanical property of polyamide resin is weakened. As shown in FIGS. 1 and 2, an extremely rapid variation is seen in specific inductive capacity between 0° and 100° C. The material is suitable for a temperature control by a capacitive reactance. The expotential variation of electric resistance also suggests that the material is suitable for this purpose.

There is no special method for mixing a polyamide resin and a surface activator.

By virtue of the above-mentioned characteristics a rectifying element having a control electrode can be employed in the control means operative with a heat-sensitive unit using such materials, whereby the device can be more simplified than a prior art one using mainly a transistor amplifying circuit.

Detailed explanation of the present invention will be made hereinafter with reference to the accompanying drawings, in which.

Figure 3:
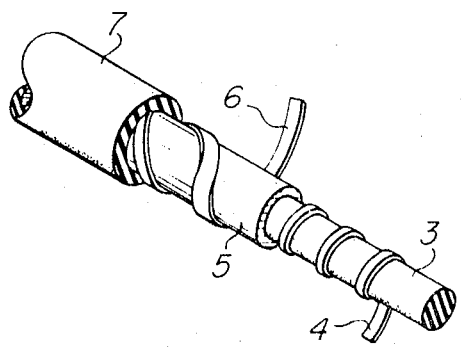
FIG. 3 is a perspective view of a heat response device according to one embodiment of the present invention.
Figure 4:
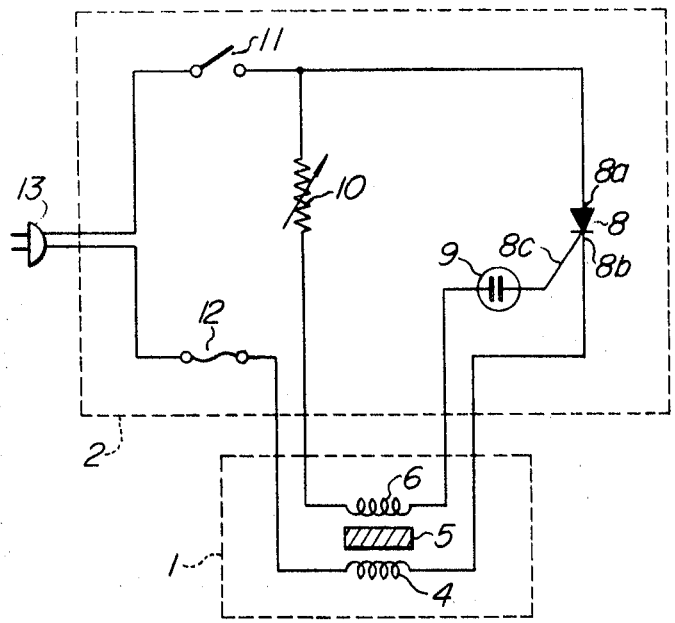
FIG. 4 is an electric circuit diagram of the same heat response control circuit according to one embodiment of the present invention.

One embodiment of this invention as shown in FIGS. 3 and 4 will be explained next.

A heater wire 4 of cadium-copper is wound around a flexible core 3 of an electric insulator. The cadmium-copper wire is covered with the aforementioned material, and around it a signal wire 6 of cadmium-copper is also wound. By covering the signal wire 6 with a nylon layer a heat-sensitive material 1 is accomplished. The heater wire acts as a load in the present invention.

The control means 2 consists of a rectifying element 8 having a control electrode, a neon lamp as an accessory unit, a variable resistor 10, a source switch 11, a fuse 12 and a source plug 13. The rectifying element and its accessory may be replaced by other suitable elements. In practice, the heat-sensitive device 1 is inserted into a blanket or a carpet while the control device 2 is accommodated in a case. The means 1 and 2 are connected by a conducting wire.

The electric circuit consists of a connection from one terminal of plug 13 via the switch 11, the positive electrode 8a of a rectifier, its negative electrode 8b, the heater wire 4 and the fuse 12 to the other terminal of the plug 13, and of a connection from one terminal of switch 11 via the variable resistor 10, the signal line 6, the neon lamp 9 to the control electrode 8c of the rectifier. In the present embodiment the rectifying element 8 is a planar-type thyristor having a plastic mold HITACHI CV-12, the neon lamp or ignitor is of the type discharging at 45 v. DC, the variable resistor 10 changes from 100 kΩ to 500 kΩ, the current fuse 12 is of 2.5 A-type, and the power source voltage is 100 to 115 v.

The operation of this circuit is as follows. When the switch 11 is closed, electric charges are stored in the capacitive component of the heat-sensitive layer through the variable resistor 10 and the signal wire 6. The voltage between the signal wire 6 and the heater wire 4 increases gradually. When this voltage reaches the discharge voltage of the neon tube, the tube becomes conductive. An ignition current flows through the control electrode 8c of the rectifier 8. Thus, the rectifier 8 is conductive until the instantaneous value of the half-wave rectifying current reaches the next half-wave period. The heater wire 4 connected in series with the rectifier 8 is thereby heated. The electric charges stored in the heat-sensitive layer 5 flow in the form of a pulse as the voltage between the signal wire 6 and the heater wire 4 immediately drops below the discharge voltage of the neon tube. The phase of this current lags behind that of the power source voltage, if the capacitive component of heat-sensitive layer 5 or the resistance of variable resistor 10 is increased. The value of the rectified current of rectifier 8 can be adjusted by varying the phase of the pulse current through the control electrode 8c with respect to that of the power source voltage. By varying the value of the variable resistor 10, the ignition angle of the rectifier 8, and hence the conduction angle can be varied. Thus, the heat generated by the heater wire 4 can be varied. If the resistance component of the heat-sensitive layer 5 decreases with temperature, charges stored in the capacitance component decrease. At the same time the period required for storing the electric charges increases, whereby the temperature control of the heater wire 4 becomes possible. Furthermore, with a decrease in the resistance component, it becomes possible to decrease the ignition current of the rectifier 8 below that level which is required for ignition. An on-off control is thus effected.

It can be understood that according to the present invention by combining a resistance decrease and a capacitance increase of the heat-sensitive layer 5 due to a temperature variation the control sensitivity is more enhanced than in the case of their independent use. Even if the impedance of the heat-sensitive layer 5 decreases with temperature, for example, the resistance component varies negatively with temperature, while the capacitance component positively therefor temperature control is possible so long as the total impedance negatively varies. However, it is advantageous in obtaining a higher sensitivity to adopt a heat-sensitive layer whose capacitance component varies positively. In particular, if the variation with temperature of the capacitance component is very small below a certain temperature, but rapid thereabove, an extremely high sensitivity and reliable operation are obtainable.

Figure 1:
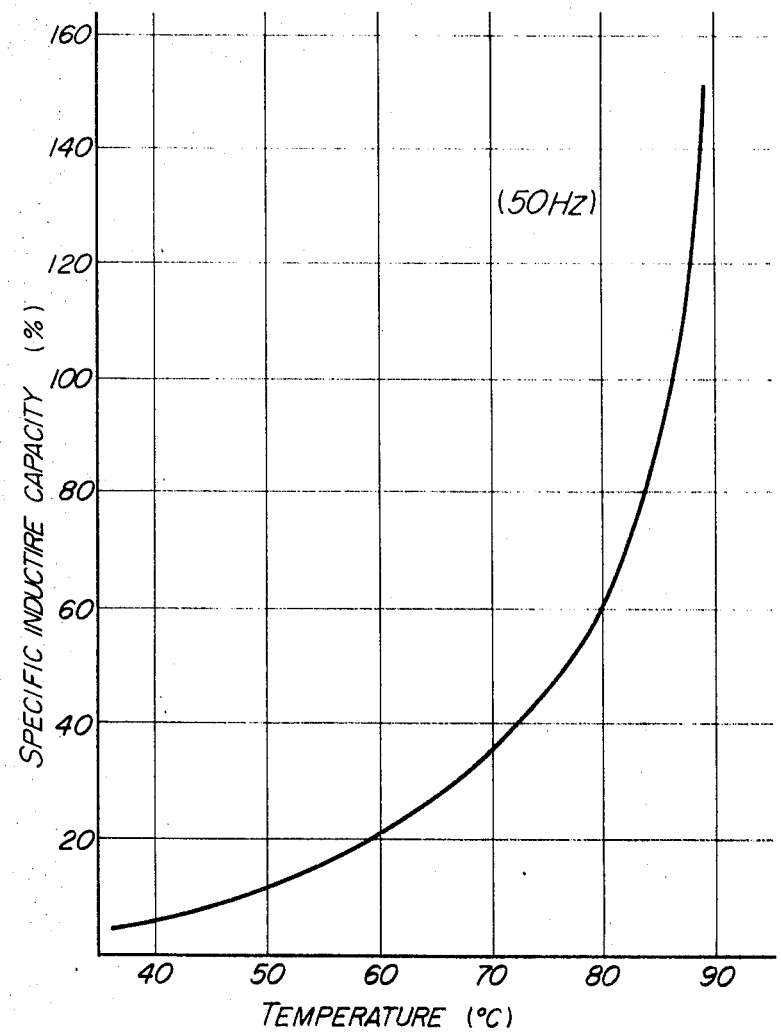
FIG. 1 is a graph showing a variation in specific inductive capacity against temperature at 50 Hz. of a polyamide compound added with a surface activator according to this invention.
Figure 2:
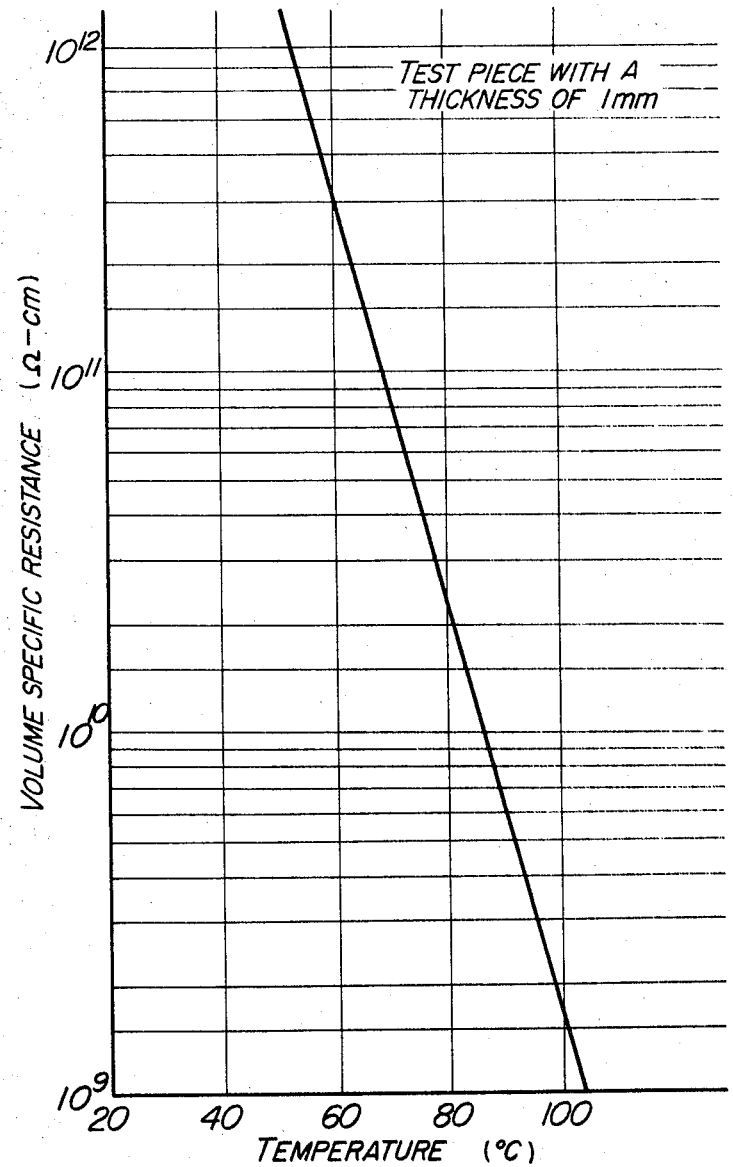
FIG. 2 is a graph showing a variation in specific resistivity of the same compound.
Figure 5:
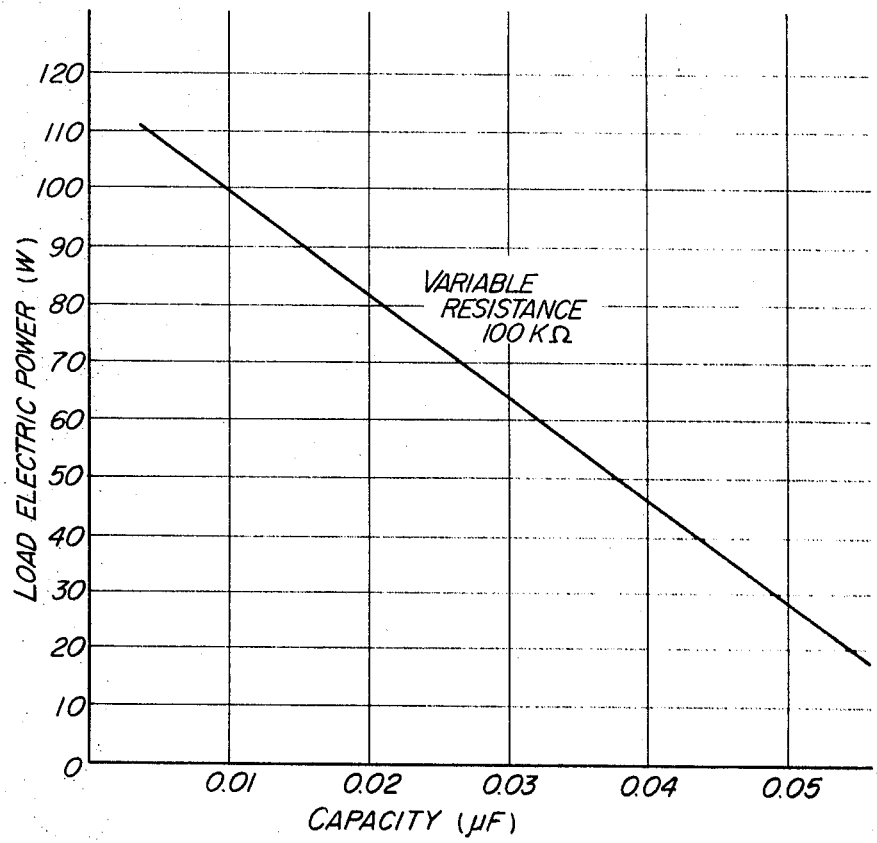
FIG. 5 is a graph showing the relationship between the capacity of a heat-sensitive layer and the electric load when the variable resistance is 100 k$\Omega$.
Figure 6:
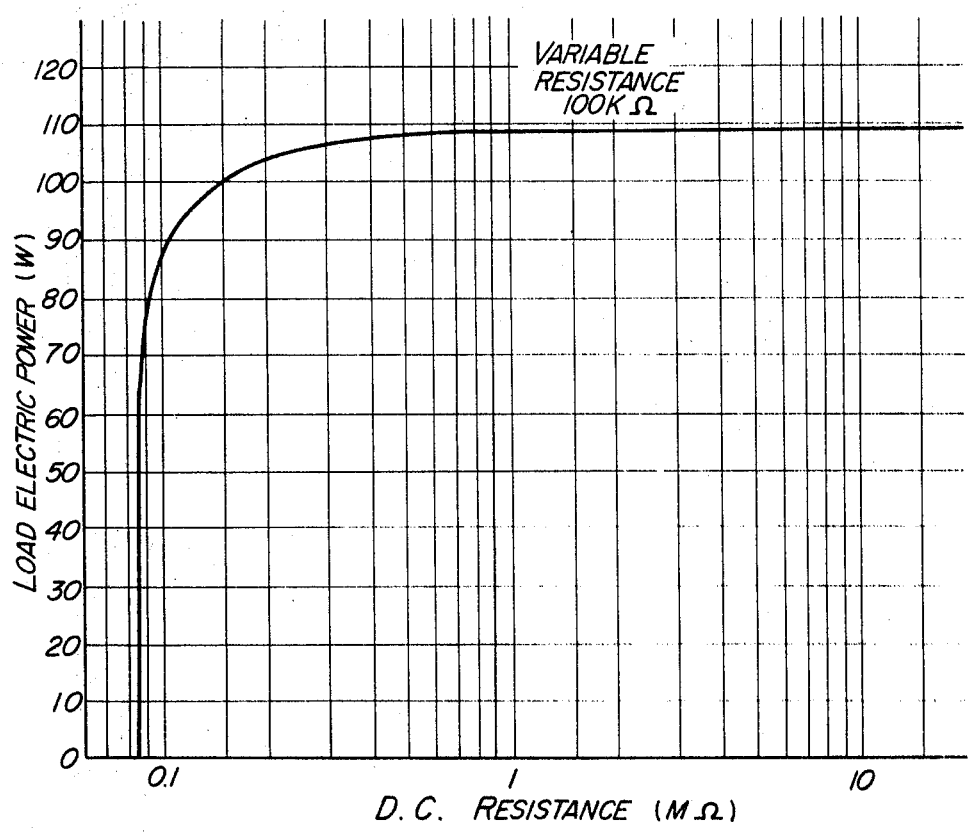
FIG. 6 is a graph showing the relationship between the DC resistance value of the same heat-sensitive layer and the electric load.

Explanation will be made of an embodiment where such a temperature control means is arranged in an electric blanket. In the circuit shown in FIG. 4, the power source voltage is 100 to 115 v., the frequency is 50 Hz., the circuit elements 8, 9, and 10 have the aforementioned characteristics, the heater wire has a resistance of 35Ω at 20°C., the heat-sensitive layer 5 has such specific inductive capacity as shown in FIG. 1 and the resistance characteristic is shown in FIG. 2, and the signal wire 6 is a conductor with a resistance of about 90Ω at 20°C. The relationship between the capacitance of the heater wire 4 and the signal wire 6 vs. the consumption power of the heater wire 4 is as shown in FIG. 5. A similar relationship of the resistance is as shown in FIG. 6. After the switch 11 is closed, the heater wire 6 begins to be heated and the temperature of the heat-sensitive layer 5 rises. The capacitance between the signal wire 6 and the heater wire 4 increases to make the conduction angle of the rectifier 8 small. Thus, the power consumption of the heater wire 4, and hence its temperature, is decreased.

Here the resistance between the heater wire 4 and the signal wire 6 decreases with temperature of the heat-sensitive layer 5. However, in an electric blanket as shown in this embodiment since the temperature of the heat-sensitive means 1 is usually between 20° C. and 70° C., the resistance between the heater wire 4 and the signal wire 6 is more than 1 MΩ. Therefore, the decrease in power consumption of the heater wire 4 is substantially small, i.e., negligibly small compared with that due to a variation in the capacitance component. In this embodiment, therefore, when the temperature of heat-sensitive layer 5 is less than 70° C., the variation in the capacitance component is important for the temperature control while above 70° C., variation in the resistance component becomes considerable, because as will be understood from FIG. 6, the variation of power consumption by the resistance component is most rapid. The variation in the capacitance component in the inventive heat-sensitive means has a character of rapid increase above a certain temperature, giving a favorable effect to the temperature control if combined with a rapid resistance variation. When an electric blanket is folded locally during use and many heater wires are concentrated in a narrow space, an anomalous temperature rise is caused in that portion. Usually, as the length of such heater wires are short and their concentration is large, the temperature difference between a folded and a normal portion becomes large. It is essential for the regular use and the extended life of the components, especially that of a cloth blanket and its plastic components, to reduce the temperature rise in the anomalously overheated section. As shown in FIG. 1, above a certain temperature limit the capacitance of the inventive heat-sensitive means shows a rapid increase with temperature while the resistance component has the effect of reducing the power consumption. Namely, electric charges sufficient to ignite the rectifier 8 cannot be stored any more so that the current in the heater wire 4 is broken. Therefore, the temperature rise in the anomalous overheated section can be reduced, whereby greater safety and an extension of life are attained.

As mentioned above, this invention using a compound of polyamide and a surface activator for the heat-sensitive layer, makes it possible to use a rectifier having a control electrode as a control means and obtains a heat response control circuit having a greater security compared with a prior art one. The advantages are a simpler mechanism, easier fabrication plus fewer troubles met by users and lower costs.

The above explanation with reference to the drawings has been made of only one embodiment of the present invention. Therefore, the invention is not limited thereto, but many other concrete constitutions may be made without departing from the spirit and scope of the present invention.

What we claim is:

1. A heat response control circuit comprising control means consisting of a rectifier element having a control electrode and an accessory unit to control the load current by controlling the conduction angle of said rectifier element by varying the ignition angle and breaking the load current by suppressing the ignition; heat-sensitive means connected to said control means to store electric charges for causing ignition up to a certain temperature; characterized in that said heat-sensitive means is made of a compound of polyamide and a surface activator having a pair of conductors separated by a control layer of said heat-sensitive polyamide compound, the electrical characteristics of said control layer being such that the electric resistance component decreases with temperature while the capacitance compound increases gradually up to a certain temperature but rapidly thereabove, means responsive to said characteristics to control the ignition angle of said control means to vary within a certain temperature range with electric charges stored between said conductors due to a capacitance variation of said control layer while thereabove the ignition becomes substantially impossible due to a decrease in electric charges as caused by a decrease in electric resistance and an increase in capacitance.